United States Patent [19]
Giovanniello

[11] 3,810,369
[45] May 14, 1974

[54] LOCKING DEVICE FOR A VEHICLE TRANSMISSION SHIFT LEVER

[76] Inventor: Michael A. Giovanniello, 915 S. 49th St., Philadelphia, Pa. 19143

[22] Filed: Apr. 16, 1973

[21] Appl. No.: 351,603

[52] U.S. Cl............................ 70/202, 70/247
[51] Int. Cl............................. B60r 25/06
[58] Field of Search ............ 70/192, 193, 194, 202, 70/211, 227, 235, 236, 247, 248, 254

[56] References Cited
UNITED STATES PATENTS

| | | |
|---|---|---|
| 2,660,874 | 12/1953 | Ziomek............................. 70/181 |
| 481,390 | 8/1892 | Egge.................................. 70/227 |
| 2,679,744 | 6/1954 | Hildebrand........................ 70/202 |
| 2,714,815 | 8/1955 | Nordstrom......................... 70/211 |
| 1,429,599 | 9/1922 | Liebowitz et al.................. 70/211 |
| 1,453,531 | 5/1923 | Smith................................. 70/211 |
| 1,805,088 | 5/1931 | Hardesty............................ 70/251 |

Primary Examiner—Albert G. Craig, Jr.

[57] ABSTRACT

A locking device for blocking the moving of the transmission shift lever of a vehicle when it is in the "park"-'position. The shift lever is released by unlocking this device. In doing so, cited means rotates from a vertical to horizontal position, freeing the shift lever to move in any of the driving positions.

1 Claim, 3 Drawing Figures

PATENTED MAY 14 1974 3,810,369
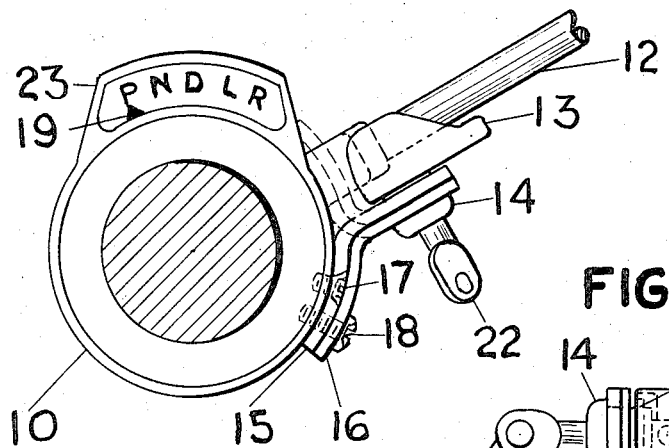
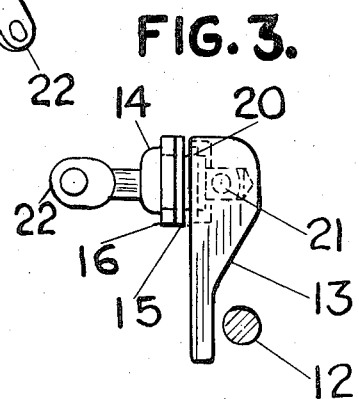
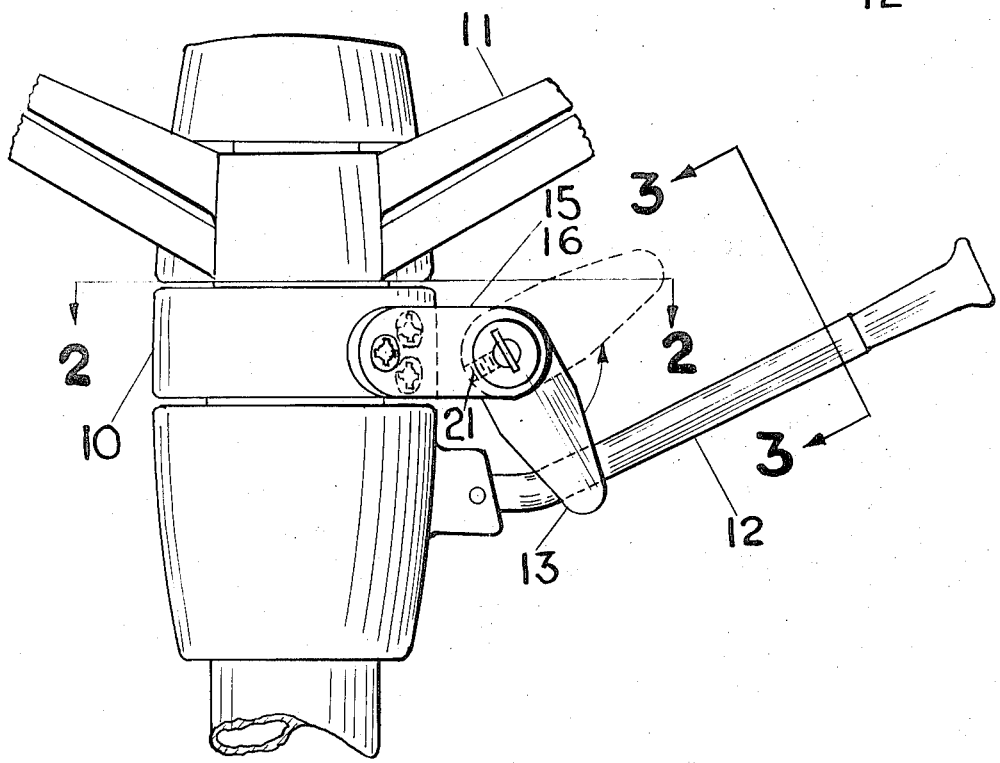

3,810,369

LOCKING DEVICE FOR A VEHICLE TRANSMISSION SHIFT LEVER

SUMMARY

The present invention composes the following parts: A pair of L-shaped brackets with the horizontal part or feet of the two brackets mounted in the upper portion of the steering column jacket. Such brackets may also be made with feet in the opposite direction as shown in dotted lines of FIG. 2. they are mounted where the dial is located, which indicates the various driving positions of the vehicle. The vertical part of the L-shaped bracket has a mounted lock; at the back of the lock is mounted a catch means plus a few hardware items.

Assume that this device has been installed in the vehicle with the transmission shift lever in a "park" position, or the catch means in back of the lock is in the vertical position. To unlock the device the operator will insert the key into the lock, turn the key counterclockwise. Thus the catch means in back of the lock turns in the same direction or in a horizontal position. This allows the transmission shift lever to move from "park" position to any other driving position, by the shift lever, visually displayed by the pointer which cooperates with the dial.

To lock the car, the shift lever must first be placed in the "park" position. The operator then inserts the key into the lock, turns the key clockwise; the catch means in back of the lock turns in the same direction or in a vertical position and the operator now removes the key from the lock. In such manner, the shift lever is not able to be moved into any other position but must remain in the "park" position. The vehicle is now immobilized.

The locking device can be readily adapted to the shift lever of most conventional automatic transmissions. It is composed of only ten parts which readily lend themselves to an economical manufacture. In addition, it can be easily mounted on existing motor vehicles by drill and tap for three small machine screws.

DESCRIPTION OF THE DRAWING

The following description refers to the accompanying drawing wherein like reference to characters refers to like parts throughout the several views and in which:

FIG. 1 is a partial elevation view of a steering column showing a motor vehicle transmission shifting lever and the device in locked position with the catch means in a down position and in the unlocked position with the cam in an upper position.

FIG. 2 is a cross section view as seen along lines 2—2 of FIG. 1 showing the relation of the shifting lever with the locking device, and a pointer in the Indicating Dial showing the position of the shift lever.

FIG. 3 is a side view as seen along line 3—3 of FIG. 1. showing the locking mechanism in relation to the shift lever.

DESCRIPTION OF THE PREFERRED EMBODIMENT

Referring to the drawing, FIG. 1. shows a motor vehicle steering column jacket 10 and steering wheel 11 with the shift lever 12 being blocked in the "park" position by the catch 13. When the cam is rotated to the 90° position by actuating the lock 14, it will allow the shift lever 12 to move freely out of the "park" position to any other position.

FIG. 2 shows the relation of the shift lever displayed by a pointer 19 which cooperates with the dial 23 to "park" position. Mount the bracket 15 on the hub of the steering column jacket 10 by drill and tap for two flat head machine screws 17. Place bracket 16 on top of the bracket 15, and drill and tap for one round head machine screw 18. Bracket 16 will cover the two flat head screws on bracket 15, preventing the unauthorized removal of the device. Insert lock 14 in the brackets 15 and 16, lock 14 being secured in place with a lock nut 20. Mount the catch 13 on the stem of the lock 14. Hold firmly in place with a set screw 21. The set screw 21 can be put in place only in the unlocked position of the catch, thus preventing the removal of the catch in the locked position as best seen in FIG. 3.

FIG. 3 clearly shows the lock 14 with the key 22 inserted in place, the brackets 15 and 16 clamped together with the lock nut 20.

I claim:

1. A locking device for a vehicle transmission shift lever comprising a L-shaped housing, one leg of said L-shaped housing having lock means mounted therein, the other leg of said L-shaped housing comprising at least two arcuate brackets for mounting one on the other, each bracket having at least one aperature aligned for receiving securing means for mounting said device on the steering column of a vehicle, the lower bracket having at least one unaligned aperature for receiving securing means so as to be covered by the top bracket when mounted on said steering column, and catch means mounted on the back of said lock means for blocking the operation of the shift lever out of the locked position, whereby when the transmission lever is in the "park" position the catch means prevents the lever from moving out of position until the device is unlocked and the catch means is rotated and clears the lever.

* * * * *